US012623636B2

(12) United States Patent
Unkovic et al.

(10) Patent No.: US 12,623,636 B2
(45) Date of Patent: May 12, 2026

(54) ROBOT STABILIZER SYSTEM AND/OR METHOD THEREFOR

(71) Applicant: Chef Robotics, Inc., San Francisco, CA (US)

(72) Inventors: John Unkovic, San Francisco, CA (US); Nicholas LaBounty, San Francisco, CA (US); Rajat Bhageria, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 0 days.

(21) Appl. No.: 19/320,858

(22) Filed: Sep. 5, 2025

(65) Prior Publication Data

US 2026/0061973 A1     Mar. 5, 2026

Related U.S. Application Data

(60) Provisional application No. 63/690,903, filed on Sep. 5, 2024.

(51) Int. Cl.
B60S 9/08          (2006.01)
B25J 5/00          (2006.01)
(Continued)

(52) U.S. Cl.
CPC ................. B60S 9/08 (2013.01); B25J 5/007 (2013.01); B25J 11/0045 (2013.01); B62B 3/10 (2013.01)

(58) Field of Classification Search
CPC .......... B60S 9/08; B25J 5/007; B25J 11/0045; B25J 9/0096; B62B 3/10
See application file for complete search history.

(56) References Cited

U.S. PATENT DOCUMENTS

| | | | |
|---|---|---|---|
| 5,011,184 A | 4/1991 | Loudon | |
| 2008/0218948 A1* | 9/2008 | Lai | H05K 5/0234 |
| | | | 361/724 |

(Continued)

FOREIGN PATENT DOCUMENTS

| | | | | |
|---|---|---|---|---|
| CN | 106184142 A | * 12/2016 | ................ | B60S 9/08 |
| CN | 109356654 A | * 2/2019 | .............. | E21F 17/18 |

(Continued)

OTHER PUBLICATIONS

Zhang et al. CN109356654, Machine English translation, ip.com (Year: 2019).*

(Continued)

*Primary Examiner* — Karen Beck
(74) *Attorney, Agent, or Firm* — Jeffrey Schox; Evan Myers

(57)          ABSTRACT

The system can include an actuator; a set of links; and a foot. The automated stabilizer can optionally include a swivel (e.g., integrated into the foot); a support structure; and a wheel assembly. However, the automated stabilizer can additionally or alternatively include any other suitable set of components. The automated stabilizer preferably functions to at least partially support a robotic assembly module against an uneven floor surface. Additionally or alternatively, an automated stabilizer can function to enable (automatic) leveling of a robotic assembly system (e.g., aligning the vertical axis of the system with a weight vector).

20 Claims, 13 Drawing Sheets

(51) Int. Cl.
  _B62B 3/10_  (2006.01)
  _B25J 11/00_  (2006.01)

(56)  References Cited

U.S. PATENT DOCUMENTS

| 2021/0112969 | A1 |   | 4/2021 | Dhese et al. |
| 2022/0016758 | A1 | * | 1/2022 | Whitiker ................. B65G 1/07 |
| 2022/0153364 | A1 | * | 5/2022 | Nahum ................... B62B 5/049 |
| 2023/0039524 | A1 | * | 2/2023 | Bhageria ............... B25J 9/0093 |
| 2023/0122840 | A1 |   | 4/2023 | Haidar |
| 2024/0190008 | A1 |   | 6/2024 | Bhageria et al. |

FOREIGN PATENT DOCUMENTS

| CN |  116019310 | A |   | 4/2023 | |
| DE |  4403658 | C2 | * | 9/1996 | ............. B62B 5/049 |
| DE |  102012205549 | A1 | * | 10/2013 | ............. A61B 6/548 |
| DE |  202016103756 | U1 |   | 10/2016 | |
| DE |  202023104150 | U1 | * | 10/2024 | ............... B62B 3/10 |
| WO |  WO-2022015863 | A1 | * | 1/2022 | ............. B66F 7/065 |

OTHER PUBLICATIONS

Friese et al. DE 10 2012 205549, Machine English Translation, ip.com (Year: 2013).*
H. Qiu, CN 106184142 Machine English Translation, ip.com (Year: 2019).*
"Certified Hygienic Leveling Feet for Food Processing", NGI, https://ngi-global.com/us/products/leveling-feet/certified-hygienic-leveling-feet, first downloaded Aug. 11, 2025.

* cited by examiner automated
stabilizer 100 retraction joint 107
with internal threads foot 104 robotic
assembly
module 200 set of
switches 210 automated
stabilizer 100 automated
stablilizer 100

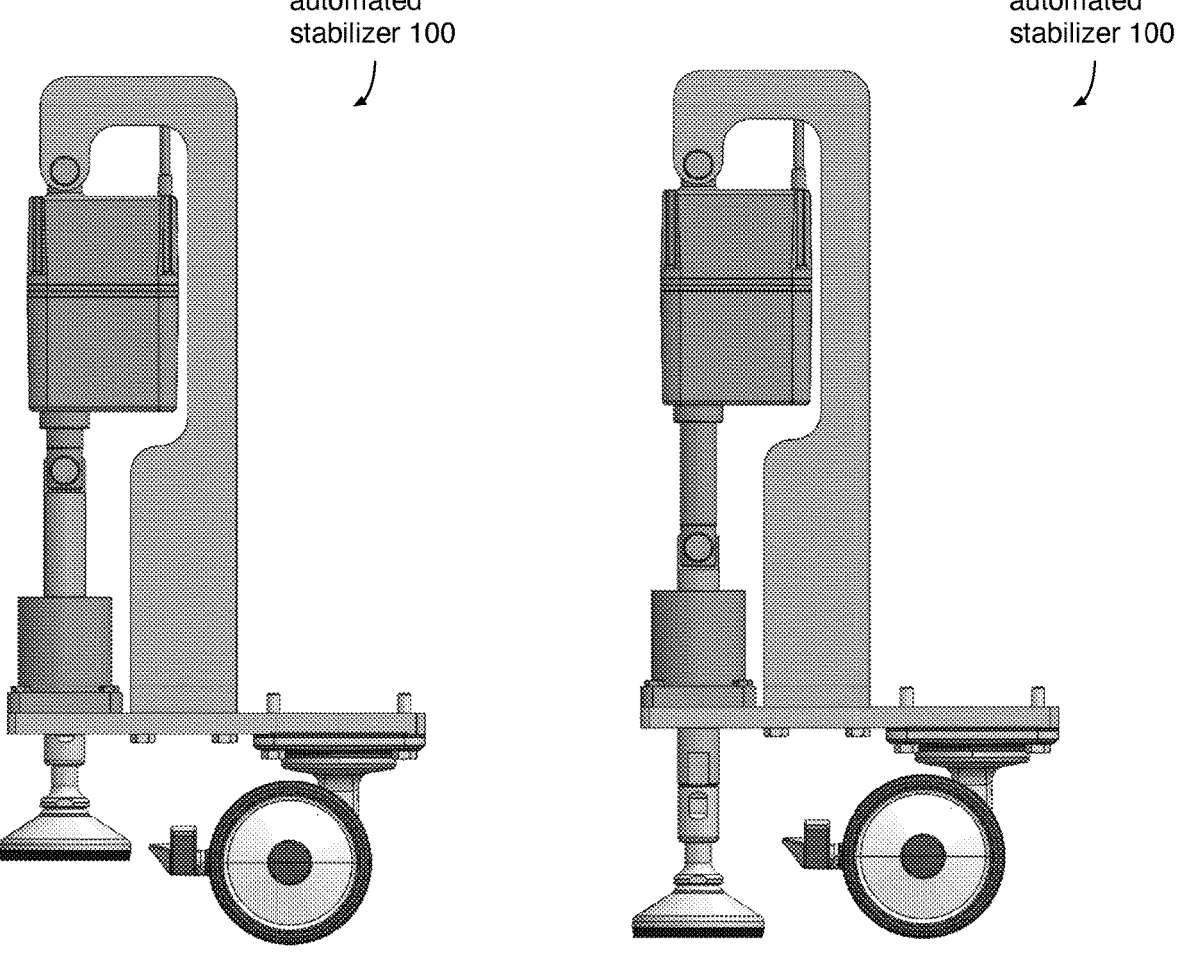
FIGURE 5A                    FIGURE 5B automated
stabilizer 100 automated
stabilizer 100 set of links 110 set of links 110 foot 104 foot 104 automatic stabilizer 100

| actuator 102 | support structure 101 |
| set of links 110 | |
| foot 104 | |
| swivel 106 | wheel assembly 105 |

FIGURE 7

FIGURE 8A                    FIGURE 8B first link 112 sleeve bearing 109 manual adjustment interface 108 second link 113 swivel 106 floor surface
(e.g., sloped 3 degrees)

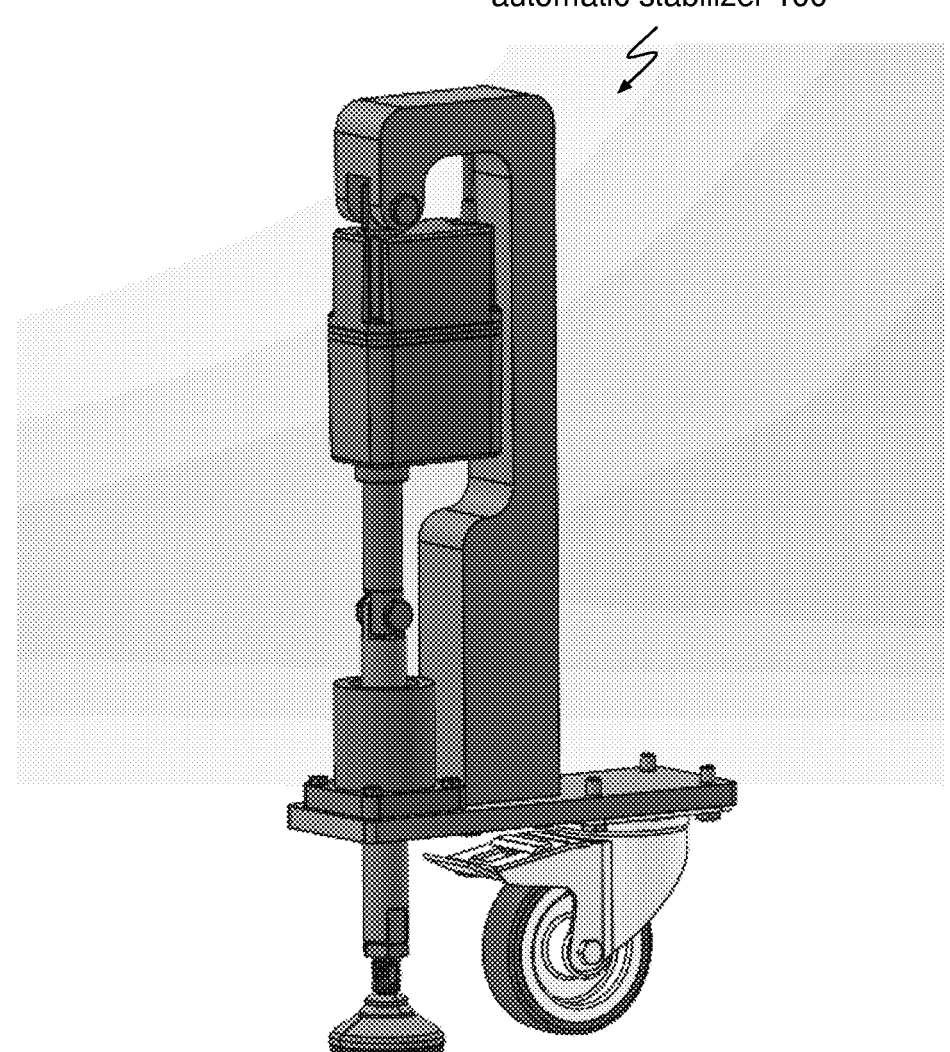
FIGURE 10A automatic stabilizer 100 automatic stabilizer 100 stroke length

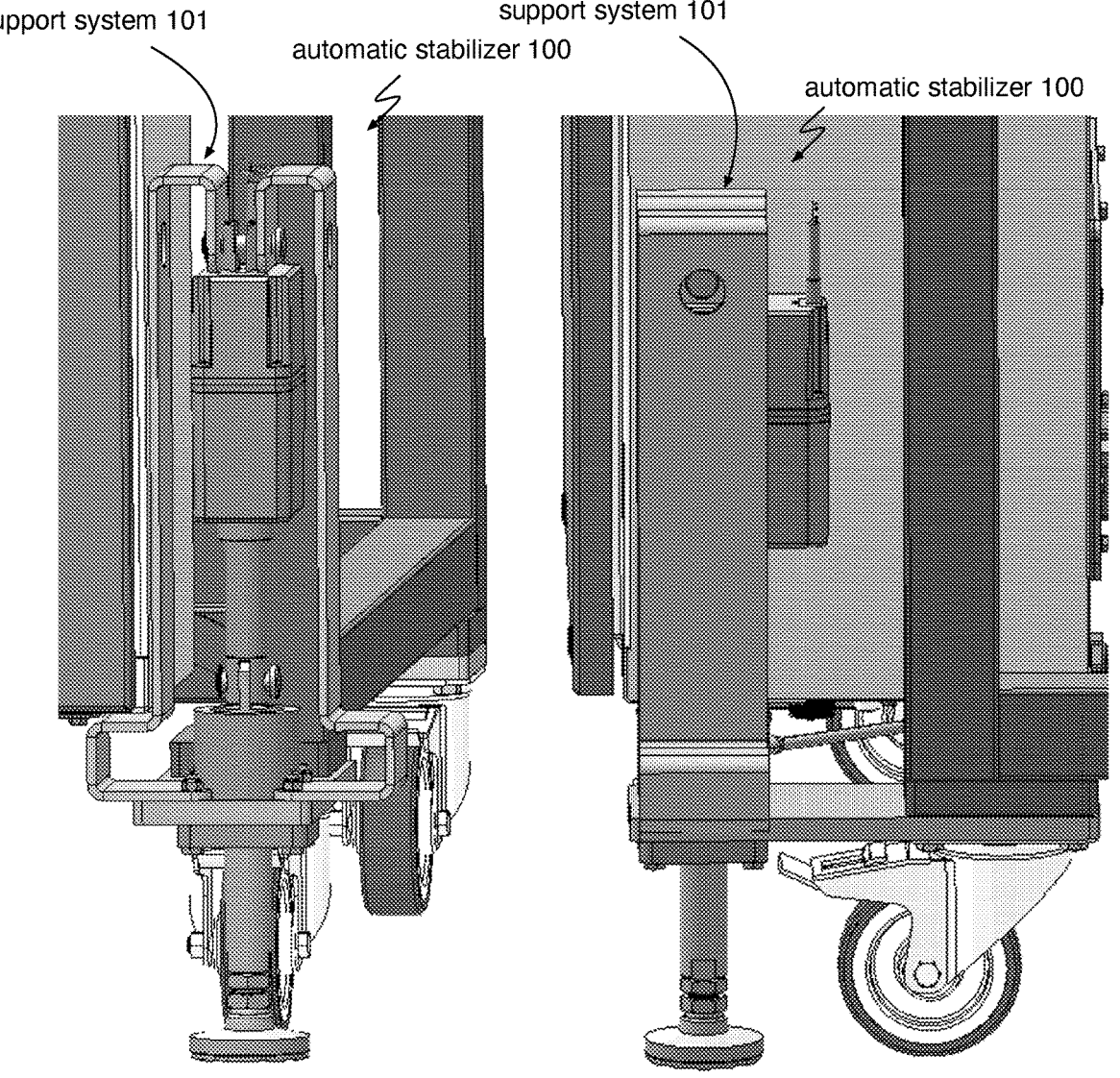
FIGURE 12A                    FIGURE 12B

ROBOT STABILIZER SYSTEM AND/OR METHOD THEREFOR

CROSS-REFERENCE TO RELATED APPLICATIONS

This application claims the benefit of U.S. Provisional Application No. 63/690,903, filed 5 Sep. 2024, which is incorporated in its entirety by this reference.

TECHNICAL FIELD

This invention relates generally to the robotics automation field, and more specifically to a new and useful automated stabilizer in the robotics automation field.

BRIEF DESCRIPTION OF THE FIGURES

FIGS. 5A-5B are side views of the system when the foot is in the retracted and deployed positions, respectively.

FIG. 7 is a schematic representation of a variant of the system.

FIGS. 10A-10B are graphical projections of a variant of the system.

FIGS. 12A-12B are a first and a second trimetric projection view of a variant of the system, respectively.

DETAILED DESCRIPTION

The following description of the embodiments of the invention is not intended to limit the invention to these embodiments, but rather to enable any person skilled in the art to make and use this invention.

1. Overview

Figure 7:
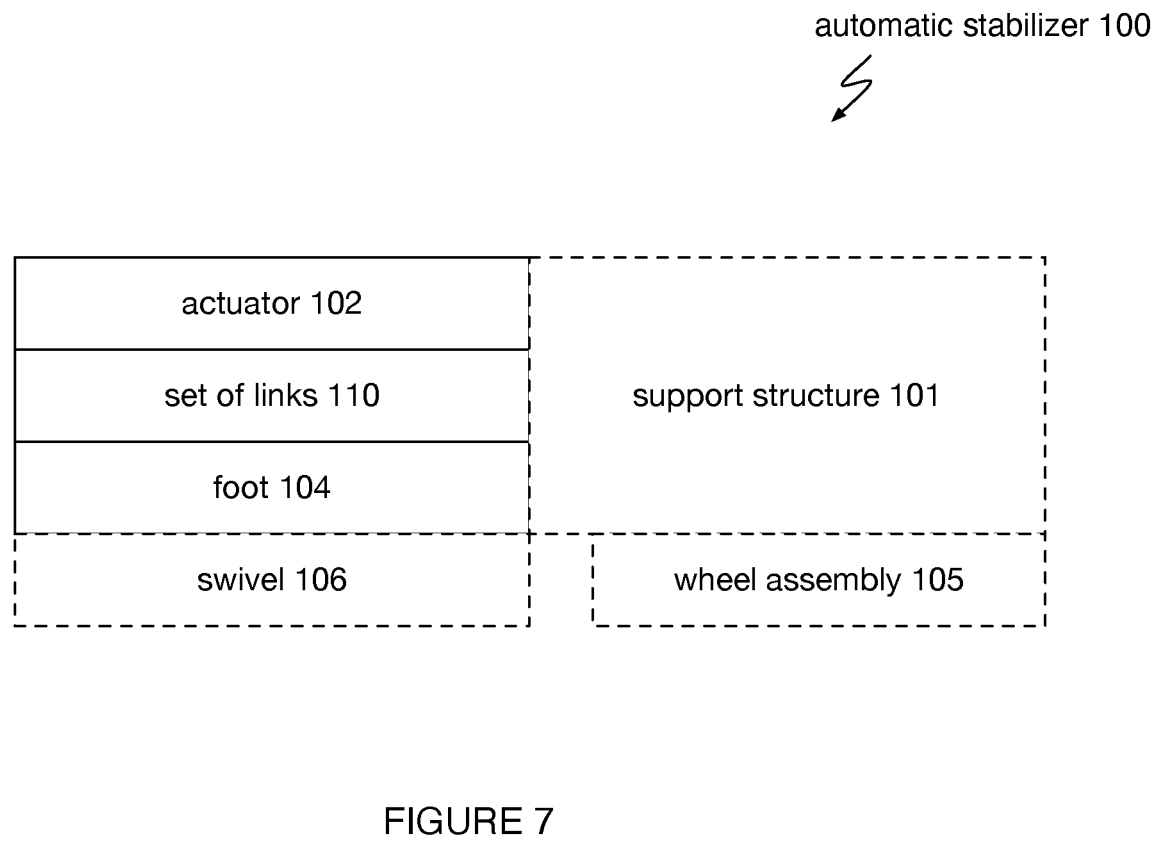
Figure 10B:
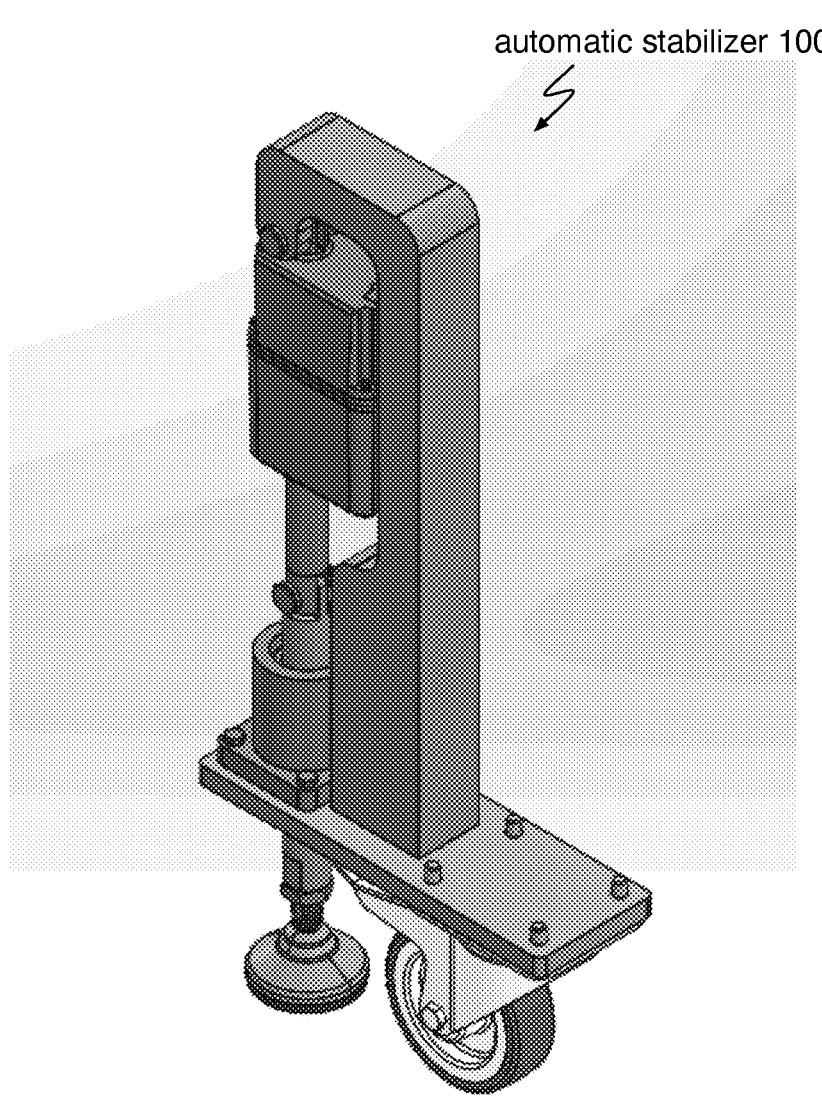

The automated stabilizer 100, an example of which is shown in FIG. 7, can include an actuator 102; a set of links 110; and a foot 104. The automated stabilizer 100 can optionally include a swivel 106 (e.g., integrated into the foot 104); a support structure 101; and a wheel assembly 105. However, the automated stabilizer 100 can additionally or alternatively include any other suitable set of components. The automated stabilizer 100 preferably functions to at least partially support a robotic assembly module against an uneven floor surface. Additionally or alternatively, an automated stabilizer can function to enable (automatic) leveling of a robotic assembly system (e.g., aligning the vertical axis of the system with a weight vector). Additionally or alternatively, the automated stabilizer can function to at least partially jack a robotic assembly module to disengage (or re-engage) to a set of caster wheels, such as to allow frequent relocation of the robotic assembly module. A first variant is shown in FIG. 10A and FIG. 10B. A second variant is shown in FIGS. 12A and 12B. However, the automated stabilizer can include any other suitable variants.

Variants of the system can optionally include or be used in conjunction with a robotic assembly system, such as a robotic pick and place system, gantry-style assembly system, multi-axis robotic arm, and/or other robotic assembly system. In variants, the system can be used in conjunction with the robotic assembly system and/or method as described in U.S. application Ser. No. 17/881,475, filed 4 Aug. 2022, which is incorporated herein in its entirety by this reference.

In variants, the automated stabilizer can optionally include or be used in conjunction with the human machine interface (HMI), line changeover, and/or refill method(s) as described in U.S. application Ser. No. 18/124,451, filed 21 Mar. 2023, which is incorporated herein in its entirety by this reference.

The system 100 can optionally include or be used in conjunction with an industrial conveyor line, or can be deployed in a high-throughput assembly application (e.g., airline food catering prep, etc.), such as to facilitate assembly by human workers and/or cooperative assembly by human operators and robots. However, the system can alternatively be deployed in any suitable assembly settings. In a second set of variants, the system can be implemented in a restaurant setting, such as a 'fast casual', 'ghost kitchen' or low-throughput application (e.g., without continuous operation; universities, K-12, prisons, hotels, hospitals, factories, stadiums, entertainment venues, festivals, etc.).

Figure 2:
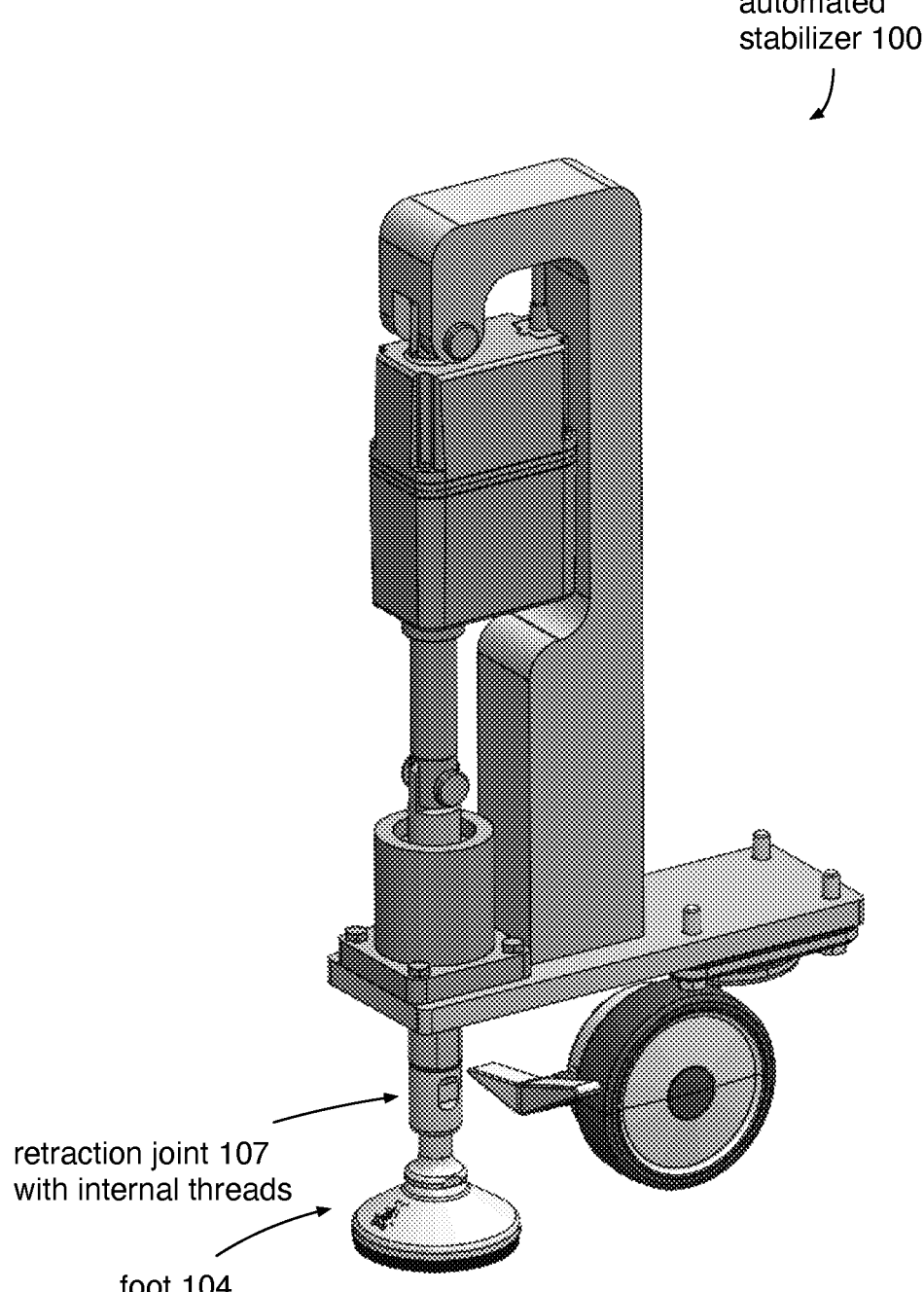
FIG. 2 is an isometric view of a variant of the system.

In variants, the system and/or each component thereof (e.g., actuator; support, mechanical linkage joints, etc.) can be configured to be individually or collectively certified in compliance with various ingress protection standards (e.g., IP65; IP67; IP69; IP67+; etc.) and operate with food safe materials (e.g., stainless steel, complaint with NSF food safety standards; for example, the internal threads of a manual adjustment interface 108 integrated with the foot and/or leg, as shown in FIG. 2, etc.). However, variants may be utilized outside of industrial applications and/or in various alternative contexts without certified compliance with ingress protection requirements/standards; and/or may be otherwise configured.

Additionally or alternatively, variants can be configured to operate in any suitable automation context and/or can be otherwise integrated in any other suitable systems as independent stabilizers.

The term "substantially" as utilized herein can mean: exactly, approximately, within a predetermined threshold or tolerance, and/or have any other suitable meaning. In a first example "substantially collinear" can refer to axes with a relative angle of 0.01%, 0.05%, 0.1%, 5%, 1%, 5%, a relative angle within an open or closed range bounded by the aforementioned values, and/or any other suitable relative angle and/or axes separated by a distance of 0.1 mm, 0.2 mm, 0.5 mm, 1 mm, 2 mm, 5 mm, a distance within an open or closed range bounded by the aforementioned values, and/or any other suitable distance. In a second example, "substantially vertical" or "substantially horizontal" can refer to an axis with a relative angle with a vertical (e.g., parallel to a gravity vector, etc.) and/or horizontal (e.g., perpendicular to a gravity vector, etc.) of 0.01%, 0.05%, 0.1%, 0.5%, 1%, 5%, a relative angle within an open or closed range bounded by the aforementioned values, and/or any other suitable relative angle.

2. Benefits

Variations of the technology can afford several benefits and/or advantages.

First, variations of this technology can enable automated deployment (and/or disengagement) of a set of stabilizers on a movable robotic assembly module, which can allow the robotic assembly module to be wheeled around to various locations in an assembly line environment with rapid, toolless engagement/disengagement of the stabilizers (e.g., robots may be moved several times a day; some assembly lines frequently operate with runs under 10 minutes, so even a few minutes of required manual adjustment to set up a robot could be prohibitively time intensive). Additionally, the integration of sensors (e.g., inclinometers, accelerometers, gyroscopes, inertial measurement units [IMUs], etc.) in variants of the technology can enable automatic leveling capabilities, further reducing setup time and improving operational consistency across multiple robotic units. The automated deployment can reduce operator fatigue and risk of operator injury associated with repetitive manual adjustments, particularly when operators crouch or kneel to access conventional manual leveling feet multiple times per shift.

Second, variations of this technology can enable automated actuation/leveling of robotic assembly modules when deployed on uneven, inclined ground (e.g., sloped floors). In particular, food industry assembly lines may rely on sloped floors for water drainage during wash down, which can result in significant variance in the necessary deployment distance (e.g., which might vary by more than 1 inch on the same floor). Accordingly, manually deployment of a conventional threaded stabilizer foot might require 20+ full rotations with a wrench (e.g., even after freely spinning it to engage the floor) in order to substantially level the system. Furthermore, the deployability of the system on inclined floors can provide operational flexibility across diverse facility layouts.

Third, variations can facilitate passive stability while the system is unpowered (e.g., which may be particularly advantageous since it may allow robots to be unplugged during washdown and line changeover operations). Additionally, variants can facilitate manual adjustment and/or retraction of the feet via a set of secondary threads (e.g., substantially coaxial with the primary axis) to allow leveling and/or disengagement while the actuator is unpowered. This dual adjustment capability can provide redundancy and operational continuity in case of a system disruption (e.g., a power outage, etc.), reducing downtime.

Fourth, variations of the technology can provide structural support/jacking while improving vibration/shock performance of the system. In particular, various robotic systems may propagate significant vibrations (e.g., within a frequency range of 5-200 Hz) into support structures and mounting hardware, which can be detrimental to control accuracy and component lifetime (e.g., due to component wear). Accordingly, structural rigidity within the load-bearing components supporting the frame may significantly improve vibration characteristics of the system (e.g., in alternative applications where mobility is not necessary, robots are typically bolted to the floor). For example, compliance within mechanical or hydro-pneumatic spring systems, such as spring leveling mounts or vibration isolators, may adversely increase the vibration amplitude in some implementations. Thus, variants may advantageously introduce manual and/or automatic adjustability without introducing additional spring elements within the load-bearing structures. The improved vibration dampening can enhance precision in pick and place operations, scale accuracy for weighing components, and overall system reliability, particularly important in high-accuracy food portioning applications.

Fifth, variations of the technology can provide enhanced food safety compliance through the use of washdown-safe materials and sealing configurations. In variants, the system can be designed to meet or exceed ingress protection standards (e.g., IP65+, IP67, IP69, etc.), allowing for high-pressure, high-temperature washdown procedures common in food processing environments. The use of food-grade stainless steel construction and food safe lubricants (e.g., National Sanitation Foundation [NSF] H1 certified, NSF 3H certified, NSF H3 certified, etc.) and/or self-lubricating materials (e.g., polyoxymethylene) can eliminate contamination risks while maintaining operational performance. Furthermore, the usage of sealed threaded connections (e.g., within the actuator, integrated with legs of the system, etc.) can prevent exposure of potentially bacteria-harboring threads to the external environment.

Sixth, variations of the technology can incorporate features that reduce the risk of accidental injury during operation. For example, two-handed switch systems (e.g., activation control switches 212 separated from a dead man's switch 211; example shown in FIG. 4, etc.) can reduce the risk of operators placing their hands underneath the stabilizer during deployment (e.g., as an operator transitions between manual and automatic deployment, etc.), while slow automatic actuation speeds can provide adequate reaction time. The spacing of control switches beyond the reach of a single hand can ensure intentional operation and reduce the likelihood of accidental activation. Furthermore, the positioning of the set of switches below waist level can force the operator to crouch while operating the stabilizers, reducing the risk of the operator placing an extremity underneath a stabilizer (e.g., a wheel thereof, a foot thereof, etc.).

Seventh, variations of the technology can provide cost-effective scalability for multi-robot installations. In variants, by mounting to a set of caster mounts on a robotic assembly module frame, the system can be configured as a drop-in replacement for existing manual stabilizer systems, reducing retrofit complexity and associated downtime.

However, variations of the technology can additionally or alternately provide any other suitable benefits and/or advantages.

3. System

Figure 1:
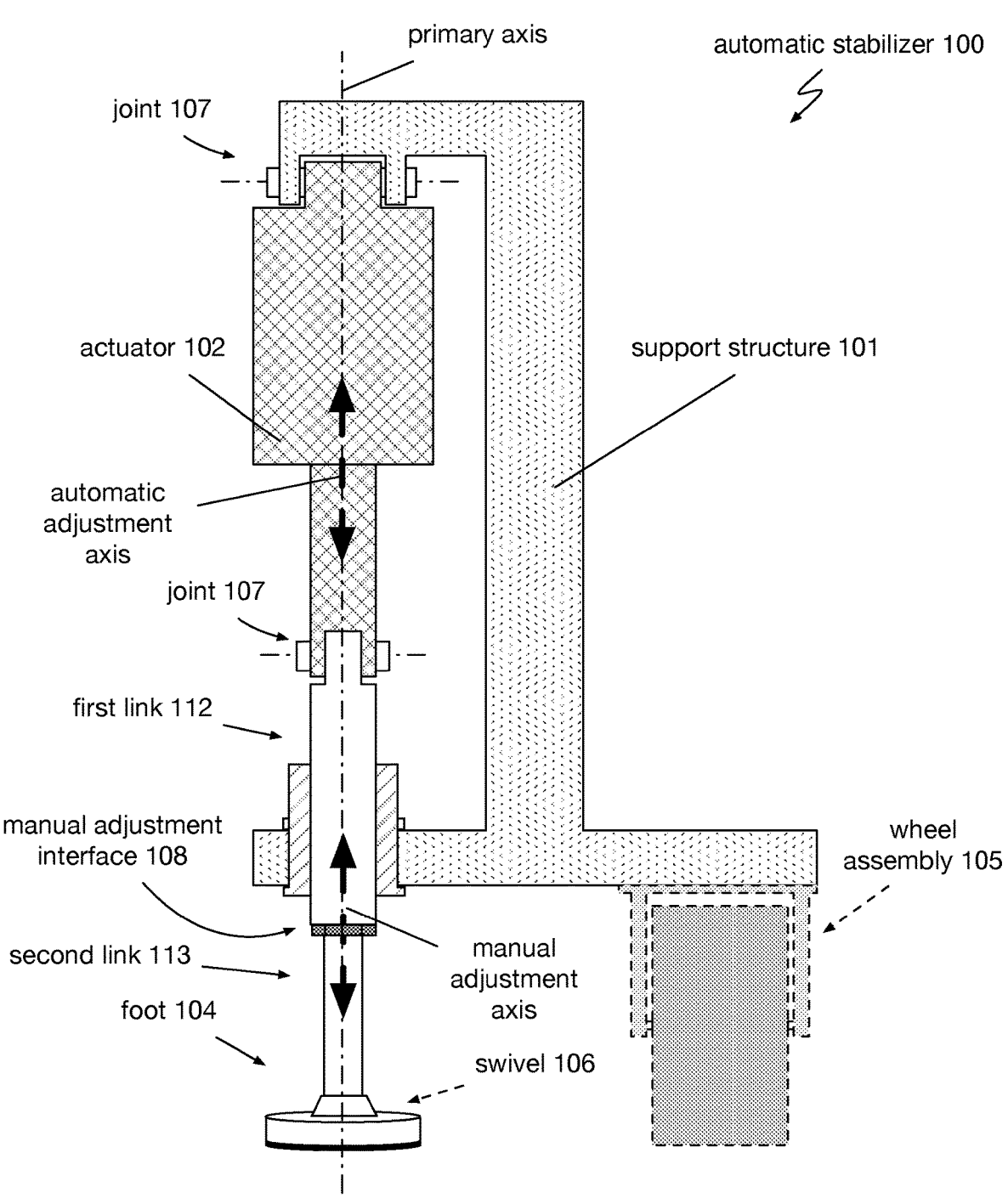
FIG. 1 is a schematic representation of a variant of the system.

The automated stabilizer 100, an example of which is shown in FIG. 7, can include an actuator 102; a set of links 110; and a foot 104. The automated stabilizer 100 can optionally include a swivel 106 (e.g., integrated into the foot); a support structure 101; and a wheel assembly 105. However, the automated stabilizer 100 can additionally or alternatively include any other suitable set of components. The automated stabilizer 100 preferably functions to at least partially support a robotic assembly module against an uneven floor surface. In examples, the automated stabilizer 100 can lift (e.g., jack) the robotic assembly module off of a floor surface. Additionally or alternatively, an automated stabilizer can function to enable (automatic) leveling of a robotic assembly system (e.g., aligning the primary axis of the system with a gravity vector). Additionally or alternatively, the automated stabilizer can function to at least partially jack a robotic assembly module to disengage (or re-engage) to a set of caster wheels, such as to allow frequent relocation of the robotic assembly module. An example of the automated stabilizer is shown in FIG. 1. In variants, the system can include a set of automated stabilizers and/or the robotic assembly module attached therewith.

Figure 3:
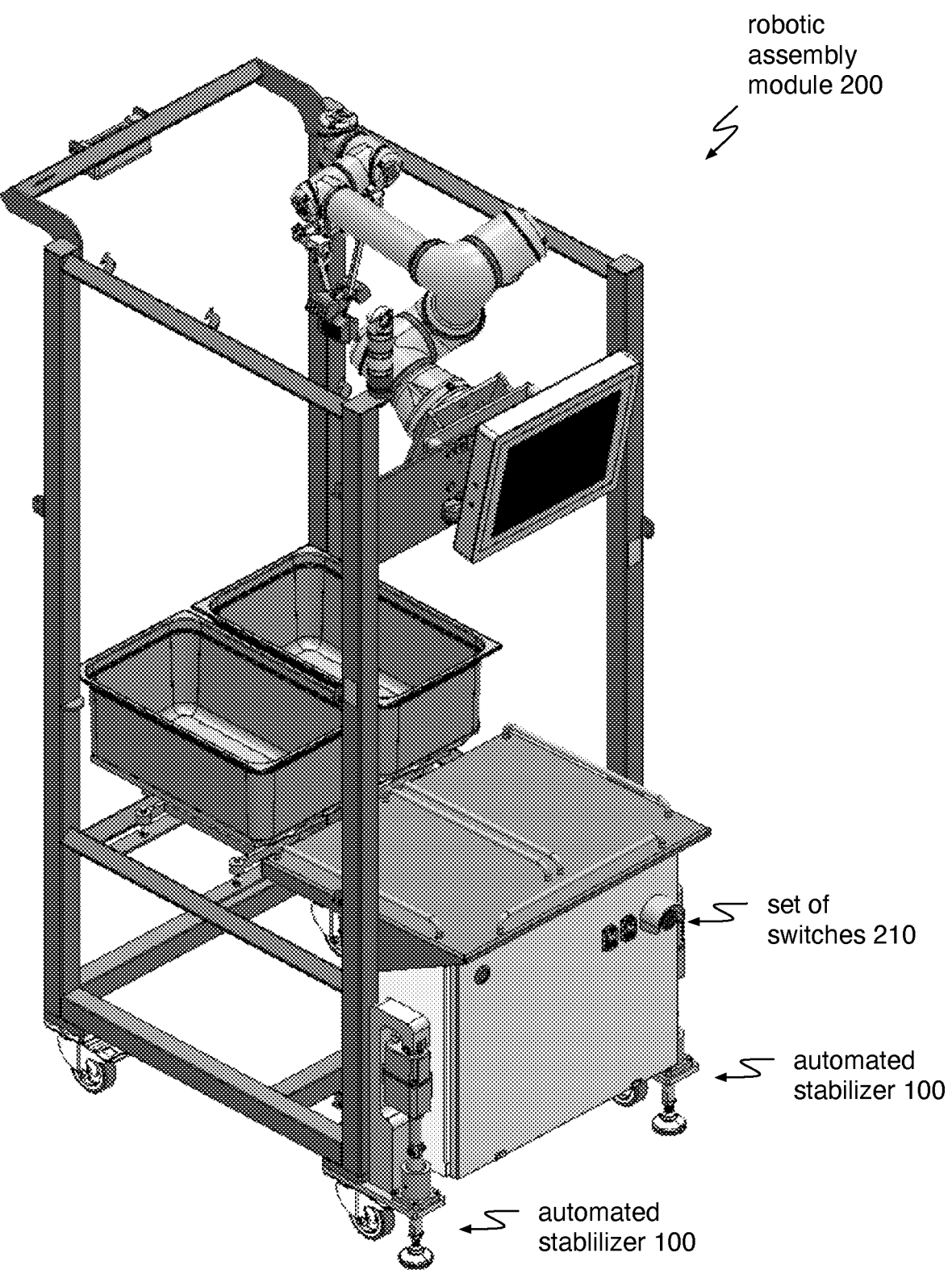
FIG. 3 is an isometric view of a variant of the system integrated within a robotic assembly module.

The automated stabilizer 100 and/or an actuator thereof is preferably configured to mount to a base end (e.g., an inferior surface of a frame, etc.) of a robotic assembly system 200, such as a robotic pick and place system, gantry-style assembly system, multi-axis robotic arm, and/or other robotic assembly system. In variants, the system can be used in conjunction with the robotic assembly system and/or method as described in U.S. application Ser. No. 17/881,475, filed 4 Aug. 2022, which is incorporated herein in its entirety by this reference. In an example, four instances of the automated stabilizer 100 are configured to mount in place of (and/or adjacent to) a set of four caster wheels, each at a respective corner of a rectangular base. Alternatively, automated stabilizers can replace a pair of casters (e.g., two front corners, proximal to a conveyor side, etc.; an example is shown in FIG. 3), may be mounted and/or operated independently (e.g., individual jacking/leveling points for any suitable systems and/or robot arrays) or arrayed in any suitable pattern(s) or distribution. However, the automated stabilizer 100 can be configured to operate with any other suitable robotic system and/or in any other suitable robotic assembly context. In an, the automated stabilizer can mount to an existing set of mounts (e.g., each including an array of holes for mounting a caster wheel to a frame of the robotic assembly module, etc.).

In variants, the system and/or each component thereof (e.g., actuator, set of links 110, etc.) can be configured to be individually or collectively certified in compliance with various food industry standards (e.g., NSF food safety standards; food safe, etc.), and/or may otherwise be considered 'food safe'. For example, variants can include or be utilized in conjunction with NSF H1 food safe grease (e.g., at each revolute joint), food safe epoxy (e.g., to seal/cover an external opening/cavity, etc.), constructed from self-lubricating, food safe materials, and/or may not utilize lubrication materials at various connections. The system and/or components thereof can be designed to meet stringent ingress protection ratings, such as IP65, IP67, or IP69K, to withstand high-pressure, high-temperature washdown procedures commonly employed in food processing facilities. The IP69K rating, in particular, can enable the system to withstand steam cleaning at temperatures up to 80° C. (176° F.) and high-pressure water jets up to 100 bar (1450 psi). In variants, linear bearing components, such as a sleeve bearing, can incorporate self-lubricating materials such as graphite-impregnated polymers or antibacterial coatings (e.g., to minimize bacterial buildup, etc.). In variants, exposed surfaces of system components can have smooth, crevice-free finishes (e.g., to prevent food particle accumulation, etc.). Additionally or alternatively, variants may be utilized outside of food applications and/or in various alternative contexts without food safety requirements/standards; and/or may be otherwise configured. Such alternative applications can include pharmaceutical manufacturing environments requiring USP Class VI materials, cleanroom applications demanding low particulate generation, marine environments necessitating corrosion-resistant materials, and/or any other suitable applications.

In variants, different automated stabilizers 100 can be spaced apart (e.g., center-to-center, etc.) by 10 inches, 15 inches, 20 inches, 25 inches, 30 inches, 40 inches 50 inches, a distance within an open or closed range bounded by the aforementioned values, and/or any other suitable distance.

In variants, the floor surface can have a slope angle of 0°, 1°, 2°, 3°, 5°, 7°, 10°, 15°, a slope angle within an open or closed range bounded by the aforementioned values, and/or any other suitable slope angle.

In variants, the frame can support a set of food safe food picking bins (e.g., for storing food used by the robot of the robotic assembly to assemble meals).

In an illustrative example, the system is preferably operable between at least a first and second mode. In the first mode, the foot is in a retracted position above a bottom surface of the wheel assembly, such that the system rests entirely upon the wheel. In this example, the force path passes from the frame through, in this order: the support structure, then the wheel assembly. In the second mode, the foot is in a deployed position at or below the bottom surface of the wheel assembly, such that the system rests entirely upon the foot. In this illustrative example, in this mode, a force path passes from the frame through, in this order: the support structure, a top joint, the actuator, a bottom joint, a first link 112 and second link 113 (cooperatively forming a retraction interface), a swivel, and the foot. In both modes, threads of the system (e.g., of the actuator, of the manual adjustment interface, etc.) are preferably non-exposed to the external environment.

The actuator 102 functions to provide an actuation input to a set of links 110 to transform the foot along an automatic adjustment axis, such as to automate actuation of the foot to structurally support the robotic assembly module 200 relative to a floor surface. The automatic adjustment axis is preferably an axis longitudinally aligned with a direction of travel (e.g., extension and/or retraction) of the actuator, but can alternatively be any other suitable axis. Additionally, the actuator can function to at least partially jack up the frame to disengage (or re-engage) a wheel assembly. Additionally, the actuator can optionally function to facilitate automatic leveling of the frame relative to a gravity vector (i.e., vertical alignment of the primary axis). In variants, the actuator can be part of a mechanical linkage mechanically coupling the support structure to a floor/ground surface, the mechanical linkage including a set of links (e.g., legs, etc.), a foot, a swivel and/or any other suitable components. In alternative variants, the actuator can be coupled to the mechanical linkage (e.g., at an output end of the actuator, etc.).

The actuator is preferably mounted to the support structure 101 of the automated stabilizer (e.g., via a joint) but can additionally or alternatively be mounted to a robotic assembly system and/or a frame thereof, but can additionally or alternatively be integrated into a robotic assembly system, independently mounted/packaged, and/or otherwise configured. In an example, the actuator is rotatably mounted: to the support structure via a first joint 107, and to a link of the mechanical linkage via a second joint 107.

In a first variant, the actuator is arranged between the support structure and the linkage. In a second variant, the actuator is arranged within the linkage itself (e.g., where a link of the linkage is an actuator). In a third variant, the actuator is arranged between the linkage and the foot. In a fourth variant, the actuator is arranged between the support structure and the frame. In a fifth variant, the actuator links two separate components of the support structure (e.g., which translate relative to each other during automatic actuation. The actuator is preferably above the sleeve bearing but can alternatively be below the sleeve bearing. However, the actuator can be otherwise arranged.

The actuator is preferably communicatively connected to a controller 300 (e.g., a controller specific to the automated stabilizer, a controller specific to the overall robot, etc.). The actuator is preferably powered electrically (e.g., servo or motor actuation), but can additionally or alternatively be hydraulically powered and/or otherwise suitably powered (e.g., by manual input, such as a hand crank or lever arm). Electromechanical actuation (e.g., linear actuators; lead screws; worm drives; etc.) may be advantageous for structural rigidity, particularly compared to alternative variants which rely on hydraulic or pneumatic actuation (e.g., which may introduce compliance due to fluid compressibility, which may have a detrimental impact on vibration characteristics and rigidity of the system as a whole). Examples of electric actuators can include AC motors, DC motors, servo motors, stepper motors, and/or any other suitable type of motor.

In variants, the actuator can include a lead screw assembly with a high-pitch (fine) thread configuration to provide self-locking characteristics that maintain foot position when unpowered. In variants, the lead screw assembly of the actuator can include a linear bearing or sleeve bearing to guide linear motion and prevent binding during actuation.

In variants, the actuator preferably uses food safe components and construction, but can alternatively use any other suitable construction. In an example, the actuator can include a housing constructed from food-grade stainless steel and sealed to IP69K standards (e.g., to withstand high-pressure washdown procedures, etc.). In such variants, components can utilize food safe lubricants (e.g., NSF H1 certified grease) and/or self-lubricating materials (e.g., to eliminate contamination risks). However, the actuator can use any other suitable food safe components.

The actuation stroke of the actuator can be linear, rotational, or a combination thereof. The actuator is preferably bi-directionally actuatable (e.g., powered in both directions along an automatic actuation axis; double acting), but can alternatively be single acting (e.g., with an opposing spring-loaded return; opposing single acting actuator; where single direction input to a mechanical linkage yields bi-directional stroke, such as a piston), and/or can be otherwise configured. The automatic adjustment axis is preferably coaxial with the primary axis but can alternatively be substantially coaxial with the primary axis (e.g., within 0.05°, 0.1°, 0.2°, 0.5°, 1°, 2°, 5°, and/or an open or closed angular range bounded by any of the aforementioned values). The actuator is preferably passively stable (i.e., non-backdrivable) when unpowered (e.g., linear actuators, lead screws, hydraulic piston, etc.), but can otherwise operate in conjunction with a passive locking mechanism (e.g., spring-loaded ratcheting, etc.), and/or can be otherwise configured.

As an example, the actuator can be a linear actuator. As a second example, the actuator can be an electric motor (e.g., providing a rotational actuation as an input and/or a combined rotation/translation as an actuation input to a mechanical linkage; which can be integrated with a high pitch lead screw mechanism, etc.).

The actuator stroke length (and/or driving stroke provided to the mechanical linkage) is preferably larger than a maximum floor deviation over the footprint of a robotic foodstuff assembly system (e.g., typically between 0.5 inches and 5 inches, depending on the footprint). Additionally, the stroke length (e.g., in combination with the geometric relationship between the wheel and the foot) preferably defines an approach angle which exceeds the maximum ramp angle within an operating environment (e.g., where exterior ramps may be limited to a max running slope of 7.5% and cross slope of 1.5%; ramp angle which is less than 15 degrees, 5 degrees, etc.). For example, in a fully retracted configuration (e.g., with the manual foot adjustment fully deployed, retracted, in a liminal/neutral position, etc.), the actuator preferably enables the system to be wheeled up an Americans with Disabilities Act (ADA) compliant ramp. For example, the stroke length can be: less than 0.5 inches, 0.5 inches, 1 inch, 1.5 inches, 2 inches, 2.5 inches, 3 inches, 4 inches, 5 inches, 6 inches, greater than 6 inches, any open or closed range bounded by the aforementioned values, and/or any other suitable stroke length. In variants, the actuator stroke length (and/or driven stroke length of the mechanical linkage) can be substantially the same as the manual adjustment range (e.g., within 50%, 20%, 10%, 5%, exactly the same, etc.) and/or can be different. For example, both stroke length of the actuator stroke length and the manual, threaded adjustment range of the foot can be about 2 inches. In a specific example, the manual adjustment range can be higher than the automatic adjustment range. In examples, the manual adjustment range can be defined by a thread travel range of a threaded interface of the manual adjustment interface. In variants, the actuator can include integrated limit switches or position sensors to detect fully deployed and fully retracted positions, preventing over-travel that could damage the mechanism or create safety hazards. However, the actuator can operate across any suitable stroke length, and/or may nominally operate within a subset of the actuation range in some variants.

However, the system can include or operate in conjunction with any other suitable actuator(s).

The mechanical linkage functions to drive foot actuation along a primary axis (e.g., central axis of foot). The mechanical linkage can include a set of links 110 (e.g., a first link 112 and a second link 113, etc.), and can additionally or alternatively include the swivel 106, the foot 104, and/or any other suitable system components. The links of the mechanical linkage can be mechanically connected to each other by a set of joints. Additionally or alternatively, the mechanical linkage can function to transform the actuator output (e.g., stroke at a driving end of the mechanical linkage) into a linear translation aligned with the primary axis (e.g., at a driven end of the mechanical linkage). For example, the mechanical linkage can include pinned joints at opposing ends of the actuator (e.g., arranged between a pair of hinged joints, with one fixed and the other driven; with substantially parallel rotational axes), the driven end constrained along a primary axis of the foot by a prismatic joint (e.g., sleeve bearing).

The mechanical linkage can include a set of joints, which preferably constrain the driven stroke to a linear degree of freedom along the primary axis. The set of joints can include: revolute joints (e.g., hinges), prismatic joints (a.k.a., sliding joints; e.g., linear bearing, sleeve bearing, etc.), spherical joints, cylindrical joints (e.g., telescoping joints), universal joints, planar joints, helical joints, cam lever joints, pin and hole adjustment interfaces, and/or any other suitable joints. The links can be coupled and/or formed into a unitary kinematic chain, multiple kinematic chains, open kinematic chains, closed kinematic chains, and/or arranged in any other suitable configuration(s) by the set of joints. The set of mechanical linkages can include one or more: lever mechanism (e.g., hinged linkage), scissor linkage, 3-bar linkage, 4-bar linkage (e.g., parallelogram linkage), and/or any other suitable linkage(s). However, any suitable types and/or arrangements of mechanical linkages can be used, and/or the system can include any other suitable mechanical linkage(s).

Figure 4:
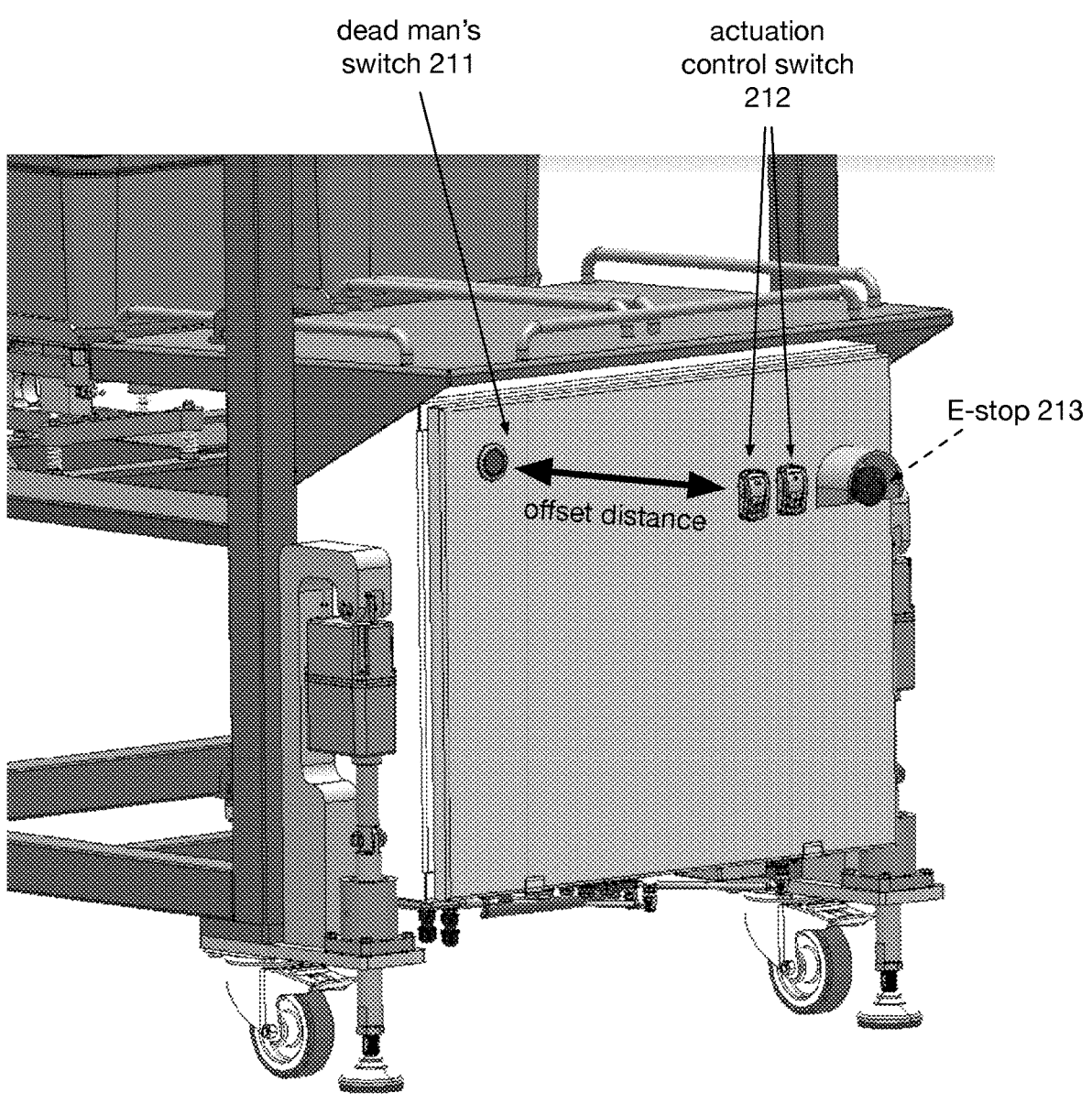
FIG. 4 is a three-dimensional view of an example of a human machine interface for control of the system.
Figure 11:
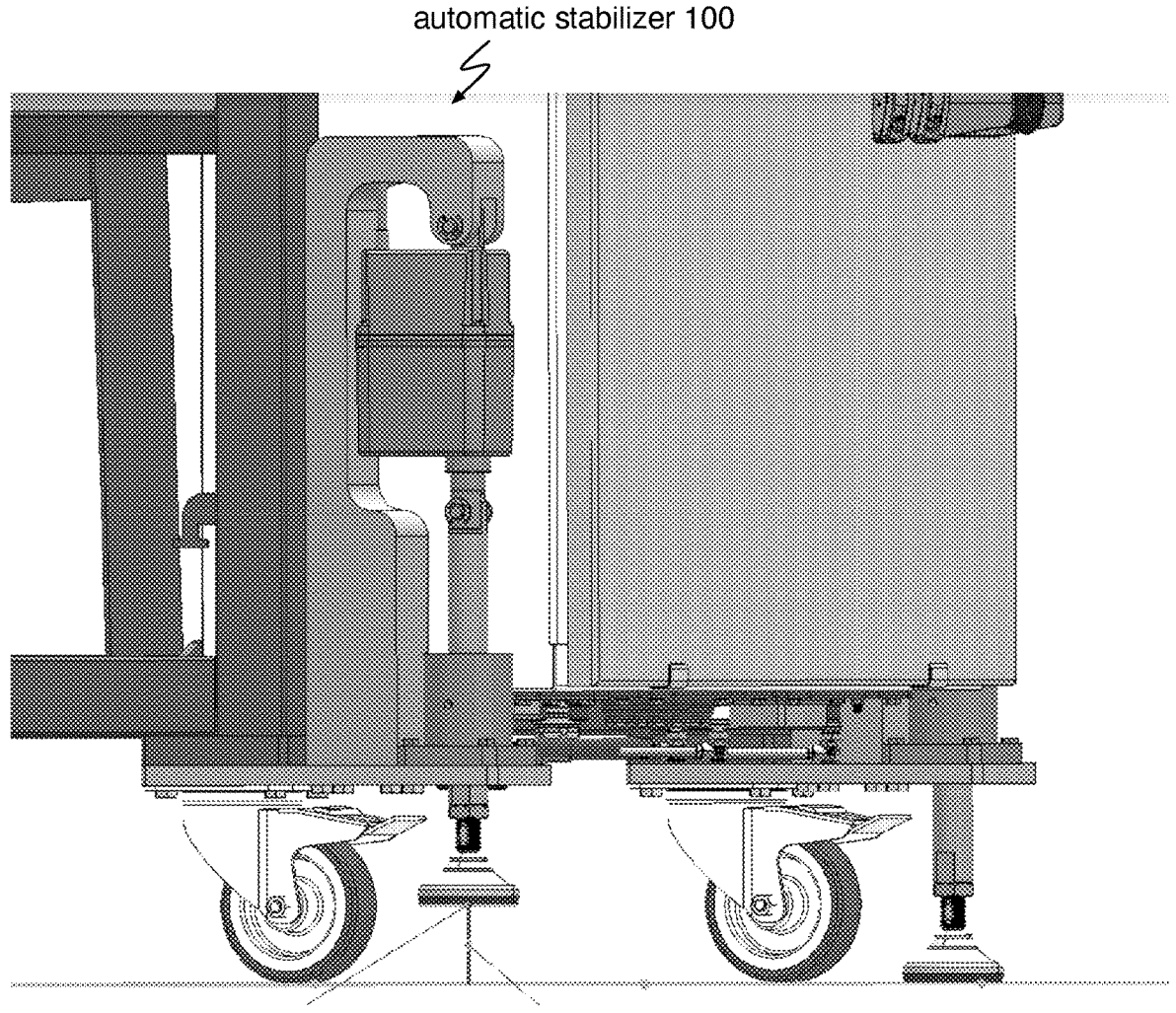
FIG. 11 illustrates an example of a retracted configuration of the system.

In variants, revolute joints between mechanical linkages can include any suitable hardware/fasteners. In a first example, revolute joints can include shoulder screws or other threaded fasteners (e.g., lock nuts/washers; etc.). In a second example, revolute joints can include grooved pins with retention clips (e.g., c-clips) and wave lock washers (e.g., an example is shown in FIG. 4; a second example is shown in FIG. 11).

In a variant, a joint 107 can be a manual adjustment interface 108 (e.g., defining a manual actuation and/or retraction interface, etc.) for adjusting the relative position of mechanically connected links and/or other connected components. The manual adjustment interface functions to facilitate manual adjustment of the foot 104 relative to the support structure (e.g., vertically; along the manual adjustment axis; etc.). As an example, this may allow the foot to be deployed by the actuator (e.g., automatically and/or manually controlled; toolless deployment) and manually disengaged using a wrench (e.g., in particular, it may generally require less work to lower the system and/or manually raise the foot relative to the frame under influence of gravity). In variants, the manual adjustment interface can be operable when the actuator and/or other system components are unpowered (e.g., to prevent the system from being locked in place during failure of peripheral systems, etc.). In example, the foot can be controlled (e.g., actuated) into the deployed position by the actuator translating the mechanical linkage; then controlled into the retracted position by a manual operator adjusting the manual adjustment interface. In a specific example, the manual adjustment interface is a set of threads of a certified hygienic leveling foot, and the foot is a certified hygienic leveling foot. The set of threads are preferably fluidly isolated from an external environment (e.g., by a seal 109 between the first link and second link, etc.; example shown in FIG. 8A and FIG. 8B, etc.) but can alternatively be exposed to the external environment.

The manual adjustment interface is preferably a threaded interface between two links (e.g., a first link and a second link cooperatively forming a leg) but can alternatively be any other suitable type of interface (e.g., a ratcheting mechanism, hand crank hydraulic system, cam lock system, etc.). Examples of threaded interfaces and/or components thereof can include lead screws, ball screws, worm gears, jackscrew mechanisms, turnbuckles, threaded rods with nuts, and/or any other suitable type of threaded interface. The manual adjustment interface preferably defines a longitudinal manual adjustment axis along which the joint can facilitate retraction and/or extension. The manual adjustment axis is preferably parallel with the primary axis, but can alternatively be merely substantially parallel with the primary axis. The manual adjustment axis is preferably coaxial with the primary axis but can alternatively be substantially coaxial with the primary axis (e.g., within 0.05°, 0.1°, 0.2°, 0.5°, 1°, 2°, 5°, and/or an open or closed angular range bounded by any of the aforementioned values). However, the manual adjustment axis can be otherwise aligned.

In a variant, the manual adjustment interface (e.g., a threaded interface thereof, including a set of inner threads and a set of outer threads, etc.) can mechanically a first link 112 of the set of links to a second link 113 of the set of links 110. The first link is preferably above the second link (e.g., distal from the foot) but can alternatively be proximal to the foot. In a first example, the foot is coupled to the second link (e.g., a swivel join). In a second example, the second link is integrated with the foot (e.g., as a single part, etc.). In a third example, the first and second links (e.g., and the manual adjustment interface therebetween, etc.) are between the support structure 101 and the actuator. In a fourth example, the first link is within the sleeve bearing and the second link is below the sleeve bearing (e.g., where the manual adjustment interface is below the sleeve bearing). In a fifth example, the first link is above the sleeve bearing and the second link is within the sleeve bearing (e.g., where the manual adjustment interface is above the sleeve bearing. In a sixth example, the support structure includes the manual adjustment interface (e.g., where the first and second link are integrated within the support structure, etc.). In a seventh example, the actuator itself can facilitate manual adjustment (e.g., where the retraction interface is within the actuator itself). In this example, the actuator can include two separate, collinear degrees of freedom: one manual and one automatic. Alternatively, the actuator can use the same degree of freedom for both automatic and manual actuation (e.g., where the lead screw of the actuator can be manually adjusted, etc.). However, the manual adjustment interface, first link, and second link can be otherwise arranged.

Figure 8:
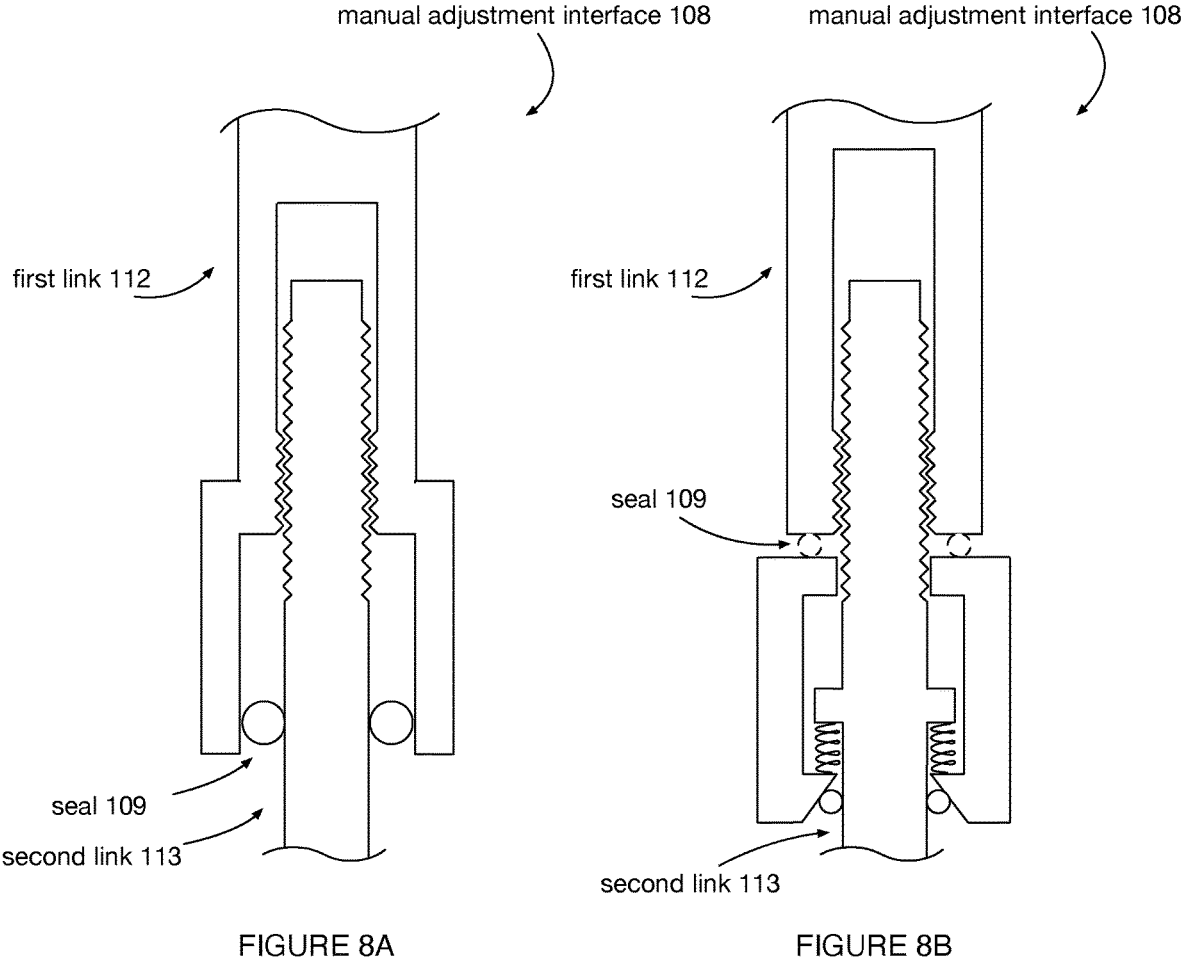
FIGS. 8A-8B are cross-sectional views of a variant of a manual adjustment interface.
Figure 9:
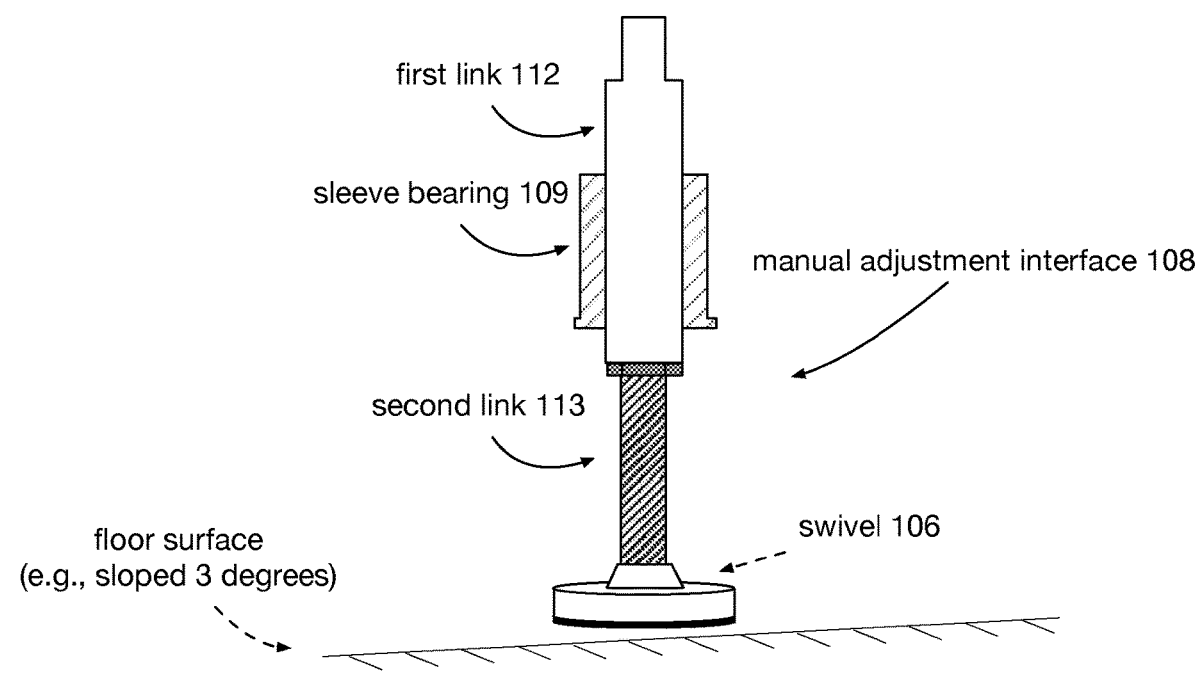
FIG. 9 is a view of a variant of a manual adjustment interface.

In a first example, the first link can include a set of inner threads which can engage with a set of outer threads of a second link (e.g., examples shown in FIG. 8A and FIG. 8B). In such examples, the outer threads of the first link can be surrounded by a cylindrical guard element. The guard element can be integrated with the first link (e.g., example shown in FIG. 8A) and sealed against the second link; can be integrated with the second link (e.g., example shown in FIG. 8B) and sealed against the first link. The guard element is preferably static relative to the first link but can alternatively move relative to the first link. In such examples, the set of threads on the first and second links can be fluidly isolated from (e.g., unexposed to) the environment (e.g., to prevent bacteria from growing within the threads). The set of seals can be on the second link (e.g., sealing against with the first link, etc.), on the guard element (e.g., sealing against with the first link), on the first link (e.g., sealing against the second link and/or guard element) and/or on any other suitable system component. In a second example, the first link includes a set of outer threads without a guard element, and the second link includes a set of inner threads (e.g., example shown in FIG. 9).

The adjustment range of the manual adjustment interface can be substantially similar to the actuator stroke or different. For instance, the manual adjustment interface preferably provides about 2 inches of travel (e.g., 2 inch adjustment range), but can additionally facilitate manual adjustments along a range of: 0 inches, 0.5 inches, 1 inch, 1.5 inches, 2 inches, 2.5 inches, 3 inches, 4 inches, 5 inches, greater than 5 inches, any open or closed range bounded by the aforementioned values, and/or any other suitable range(s). In variants, the adjustment range of the manual adjustment interface can be greater than the stroke length of the actuator (e.g., by 1%, 2%, 5%, 10%, 20%, 50%, a percentage within an open or closed range bounded by the aforementioned values, and/or any other suitable range).

The manual adjustment interface is preferably controlled independently of the actuator but can alternatively be controlled in concert with the actuator.

However, a manual adjustment interface can be otherwise configured.

However, the mechanical linkage can be otherwise configured

The sleeve bearing 109 functions to maintain alignment of the mechanical linkage with the primary axis. The sleeve bearing preferably constrains horizontal motion of a link enclosed therein while allowing vertical motion and rotation of the link about the primary axis; however, the sleeve bearing can otherwise define link kinematics. The sleeve bearing is preferably configured to guide movement of the leg during both actuation by the actuator and manual adjustment via the threaded interface; however, the sleeve bearing can be otherwise configured. The sleeve bearing is preferably concentric with the primary axis but can alternatively not be concentric with the primary axis. In a specific example, an inner surface of the sleeve bearing defines the primary axis. In examples, the sleeve bearing can define a prismatic joint relationship between the driven end of the mechanical linkage and the foot. The sleeve bearing is preferably fixed (e.g., relative to the support structure and/or wheel assembly) but can alternatively move relative to the support structure. In a first example, the sleeve bearing is integrated within the support structure (e.g., as a single piece, etc.). In a second example, the sleeve bearing is mounted to the support structure. However, the sleeve bearing can be otherwise connected to the support structure.

In a first example, the sleeve bearing can engage with an outer surface (e.g., a cylindrical outer surface, etc.) of the first link. In a second example, the sleeve bearing can engage with an outer surface of the second link. However, the sleeve bearing can otherwise engage with any other suitable surfaces of the mechanical linkage.

In variants, the sleeve bearing can facilitate motion of the mechanical linkage due to both manual and automatic actuation (e.g., where the manual adjustment interface is above the sleeve bearing, etc.); can facilitate motion of the mechanical linkage due to automatic actuation only (e.g., where the manual adjustment interface is below the sleeve bearing, etc.); and/or can facilitate any other suitable type of actuation and/or combination of types of actuation.

However, the sleeve bearing can be otherwise configured.

The foot functions to structurally support the system relative to a floor surface and/or the ground. The foot can additionally function to dampen vibration. The foot is preferably adjustable along the manual adjustment axis relative to the output end of the actuator (e.g., via the manual adjustment interface), but can additionally and/or alternatively be fixed (e.g., during operation), non-adjustable, externally adjustable (e.g., by adjustment of the mechanical linkage and actuator relative to the support structure), and/or can be otherwise suitably configured.

The foot is preferably operable between a deployed position (e.g., below the wheel assembly; example shown in FIG. 5B) and a retracted position (e.g., above the wheel assembly; example shown in FIG. 5A). In an example, while the foot is in the deployed position, all force paths between the support structure and the floor pass through the foot, and none pass through the wheel. In another example, while the foot is in the retracted position, all force paths between the support structure and the floor pass through the wheel assembly, and none pass through the foot. In variants, the deployed position of the foot is preferably passively stable in each (load-bearing) configuration. For instance, both the manual and automated adjustment mechanisms are preferably non-backdrivable and/or provide passive locking mechanism (e.g., spring-loaded ratcheting, etc.), but can additionally be used with an active locking/retention mechanism (e.g., adjustment of a nut) and/or can be otherwise configured.

As an example, the foot can include a leveling swivel foot (e.g., with an extended thread shank).

The feet are preferably outwards from the wheel assembly relative to a support polygon defined by automated stabilizers at corners of the frame but can alternatively be inwards from the wheel assembly. In examples, when the feet are deployed, the feet can increase the size of the support polygon relative to when the feet are retracted. However, the feet can be otherwise positioned.

The distance between a foot and a wheel assembly of an automated stabilizer can be 1 inch, 2 inches, 3 inches, 4 inches, 5 inches, 6 inches, 8 inches, a distance within an open or closed range bounded by the aforementioned values, and/or any other suitable distance. In variants in which caster wheels are used, the distance between a wheel and a foot can vary by 1 inch, 2 inches, 3 inches, 4 inches, 5 inches, and/or any other suitable range of distances during system operation (e.g., while caster wheels change direction during traversal of the system across a floor surface, etc.).

The adjustment range of the foot (e.g., automatic actuation provided by the actuator and/or manual adjustment provided by the manual adjustment interface) preferably exceeds the radius of the wheel, but can additionally or alternatively be any other suitable fraction of the radius (e.g., less than 50%, 75%, 125%, 150%, 200%, greater than 200%, any open or closed range bounded by the aforementioned values, etc.), and/or can be otherwise configured. As an example, the caster wheel can be a caster wheel with a diameter between 2.5 inches and 3 inches (e.g., 2.75 inch diameter).

However, the foot can be otherwise configured.

In variants, the system 100 and/or foot thereof can optionally include or be used with a swivel mechanism, which functions to rotate the foot (and/or a distal portion thereof) relative to the floor surface normal, which can improve stability and/or vibration characteristics (e.g., increasing contact surface area on inclined/uneven floor). For example, the swivel can be integrated into the foot (e.g., an adjustable swivel foot), such as with a ball and socket joint, spherical bearing, rod end, or similar 2D swivel mechanism. The swivel is preferably a multi-axis swivel joint, but alternatively be hinged along a single axis (e.g., parallel to a linkage hinge, along a long axis, etc.) and/or can be otherwise configured. For instance, in alternative variants the swivel can be integrated into the support structure (e.g., both the wheel assembly and the foot may swivel together) and/or the system can be otherwise configured.

However, the swivel can be otherwise configured. Alternatively, variants of the automated stabilizer can altogether exclude a swivel mechanism or rotary joint (aligned with the central axis of the foot). For instance, the foot can instead include a deformable foot and/or base material (e.g., rubber, compressible pneumatic chamber, etc.) and/or can include a domed contact surface. In a specific example, the foot can include a rubberized contact surface configured for food-safe environments. However, the system can be otherwise configured.

Variants of the system can optionally include or be used in conjunction with a support structure, which functions to mount the automated stabilizer to a robot (e.g., robotic assembly system and/or frame thereof) or other hardware system, and configured to transfer loads therebetween. For example, the support structure can be integrated into a frame of a robotic assembly system (e.g., unitary weldment) and/or can be modular (e.g., example shown in FIG. 2) and separately attached by mechanically fastening (e.g., by bolting, clamping, etc.) or other mounting techniques. As an example, the support structure can be configured to removably mount the automated stabilizer (e.g., along with an optional wheel assembly) in place of a caster wheel. However, the system can be otherwise configured.

Variants can optionally include or operate in conjunction with a wheel assembly, which functions to facilitate wheeled traversal of a robot or other hardware system (e.g., with the feet raised in a retracted position, while the feet are load bearing). The wheel assembly can include a fixed wheel or a swivel caster wheel.

However, the wheel assembly can be otherwise configured.

The system can optionally include or be used in conjunction with a human machine interface (HMI) which functions to provide a user interface for controlling and monitoring the system. The HMI can include various input and output devices, for example, buttons, switches, touchscreens, displays, or indicators. The HMI can be configured to receive user inputs and display system information. For example, the HMI can allow an operator to start, stop, or adjust the operation of the actuator. The HMI can also display status information, such as the current position or speed of the foot. The HMI can additionally include risk mitigation features, such as emergency stop buttons 213, dead man's switches (e.g., which may require two hand operation; an example is shown in FIG. 4), and/or user authentication mechanisms, to prevent unauthorized or unsafe operation of the system; examples of which are shown in FIG. 4.

In an example, the dead man's switch requires continuous pressure or activation by an operator to maintain system operation (e.g., to continuously operate the robot, etc.). In this example, if an operator releases the switch, the system automatically stops or returns to a safe state. In this example, the dead man's switch ensures that equipment cannot continue operating if the operator becomes incapacitated or loses control of the system, thereby preventing potential accidents or injuries. In a specific example, the processing system is configured to control the foodstuff assembly robot to perform an action only when both the dead-man's switch and the control switch are simultaneously activated. The dead man's switch is preferably a button, but can alternatively be any other suitable type of switch. However, the dead man's switch can be otherwise configured.

In a first variant, the optional HMI can be integrated directly into the robotic system. For example, the optional HMI can be mounted on the support structure or incorporated into the controller housing.

In a second variant, the optional HMI can be a remote device that communicates wirelessly with the system. For example, the optional HMI can be a mobile application or a dedicated remote control unit.

The HMI can include a graphical user interface with a touchscreen display, but can additionally and/or alternatively be a physical control panel with buttons and switches.

As an example, an operator can raise/lower the actuation by pressing both a dead man's switch and a rocker switch (e.g., instead of manually spinning leveling feet down to the floor before module operation), which may be separated by more than the span of a human hand (e.g., 8 inches apart, 10 inches apart, 15 inches apart, 20 inches apart, a distance apart in an open or closed range bounded by the aforementioned values, and/or any other suitable distance apart) to require two hand activation. The dead man's switch can be a momentary switch that has to be pressed for power to run to the rocker switches, whereas the rocker switches are momentary-off-momentary double pull, double throw switches that supply power to the actuators; thus, both the dead man's and rocker switches may need to be pressed to allow automated actuation, preventing inadvertent actuation from a person or cart hitting a single switch (e.g., which may additionally add a layer of failure redundancy in the case that a momentary switch breaks in a state that causes it to remain on).

Additionally, the switches can be placed below waist level (e.g., 35 inches off the floor) to make it more difficult for the operator to place their foot under the leveling feet, since they may naturally bend over or squat to press the switches. Additionally or alternatively, a guard around the feet may reduce the gap to the floor to reduce or eliminate the potential for a human's foot to slide under (e.g., remove pinch point).

However, the optional HMI may be configured in other suitable ways to provide user interaction with the system.

The optional controller 300 functions to control the actuator to operate foot position. The controller can be configured to receive input signals and generate output signals to regulate the movement and positioning of the various components of the system. The controller can include a processor, memory, and input/output interfaces. For example, the processor can be a microprocessor, microcontroller, or application-specific integrated circuit (ASIC). The memory can store instructions and data for execution by the processor. The controller can be programmed with algorithms and control logic to manage the actuation of the system components. For instance, the controller can determine the appropriate timing and sequence of actuator movements to achieve desired foot motions, positions, and/or facilitate automatic leveling. The controller preferably controls each stabilizer independently, but can alternatively control all stabilizers together (e.g., to achieve a desired angle, to lift all wheels off the floor, etc.). In examples in which the stabilizers are controlled to lift the wheel assemblies off the floor, the controllers can control the actuators to actuate (e.g., extend the feet, etc.) until a target weight parameter (e.g., measured as vertical force applied to the actuator, etc.) is achieved. In such examples, the target weight parameter can be a fraction of the overall system weight (e.g., ¼ of the system weight for a system supported by 4 stabilizers, etc.), a value measured during calibration (e.g., when a human operator verifies that each stabilizer is in the second mode, etc.), and/or any other suitable target weight parameter.

In a first variant, the controller can sample feedback from sensors to determine a system state. These sensors can include, for example, position sensors, force sensors, accelerometers, gyroscopes, inclinometers, IMUs, and/or any other suitable sensors. The controller can use this sensor data to implement closed-loop control strategies, adjusting the system's behavior in real-time based on the current conditions. Alternatively, the system can operate by feed-forward and/or open loop control, and/or can be otherwise configured.

In a second variant, the controller can interface with the optional human-machine interface (HMI) to receive user inputs and provide system status information. The controller can interpret user commands and translate them into appropriate actions for the actuator and mechanical linkage. In a first example, each HMI controls a single stabilizer (e.g., a single actuator thereof). In a second example, each HMI controls a pair of stabilizers (e.g., a pair of stabilizers proximal to the conveyor, a pair of stabilizers distal from the conveyor, etc.). In this example, the system can include a single HMI (e.g., in variants of the system including a single pair of stabilizers) a pair of HMIs (e.g., in variants of the system include two pairs of stabilizers, one for a side proximal to the conveyor and one for a side distal from the conveyor, etc.). The controller is preferably implemented as a digital electronic device, but can additionally and/or alternatively be an analog control system or a hybrid analog-digital system. The controller can include communication interfaces to enable connectivity with external devices or networks. For example, the controller may have wireless capabilities such as Wi-Fi, Bluetooth, or cellular connectivity to allow remote monitoring and control of the system.

Figures 6A, 6B:
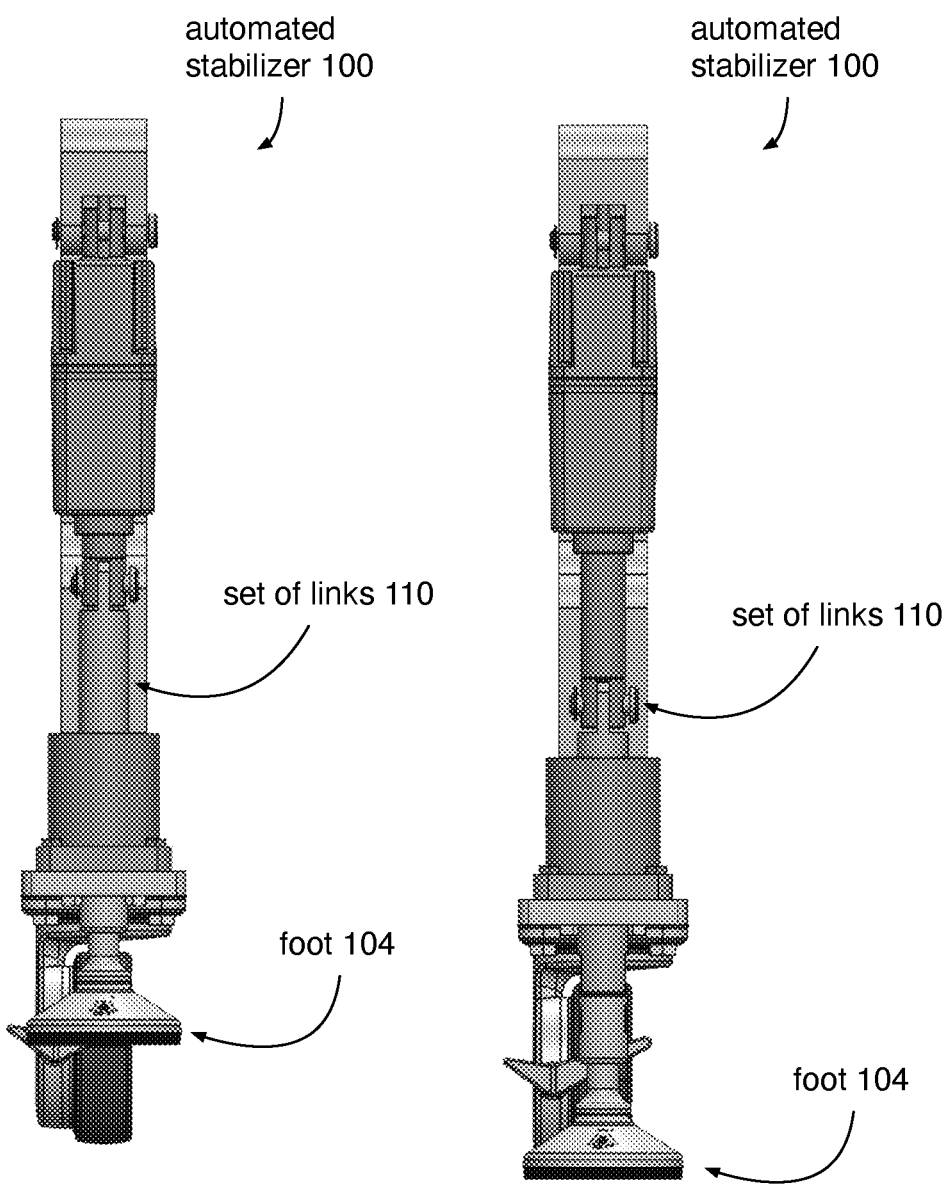
FIGS. 6A-6B are front views of the system when the foot is in the retracted and deployed positions, respectively.

In variants, the controller can be configured to implement various control modes, such as position control, force control, or impedance control, depending on the specific requirements of the application. In an example, the controller can be configured to control the actuator to switch the foot between the deployed position (e.g., example shown in FIG. 6A) and the retracted position (e.g., example shown in FIG. 6B). In variants, the controller can automatically level the robotic assembly module and/or components thereof relative to: a gravity vector, the floor, a wall, a conveyor belt adjacent to the module, another robotic assembly module and/or any other suitable reference. In variants, the controller can control the automated stabilizers to align the robotic assembly relative to any of the aforementioned elements. In an example, the controller controls the automated stabilizers to align the robotic assembly relative to a top surface of a conveyor (e.g., such that the robot is within a threshold vertical distance of the conveyor, etc.), such that food safe bins can transition from the conveyor to the robotic assembly module in a consistent manner. In a second example, the controller controls the automated stabilizers to lift the module until all force paths passing through the stabilizer pass through the foot (e.g., until the wheel is lifted off the floor, etc.). However, the controller can otherwise implement control modes.

However, the optional controller may be configured in other suitable ways.

In variants, the HMI and/or controller can include or operate in conjunction with the system and/or element(s) as described in U.S. application Ser. No. 18/124,451, filed 21 Mar. 2023, and/or U.S. application Ser. No. 17/881,475, filed 4 Aug. 2022, each of which is incorporated herein in its entirety by this reference.

In a first example, the HMI can extend and/or retract while the operator presses an extension and/or retraction button. In a second example, the HMI can solicit a desired angle between the floor angle and a foodstuff preparation surface of the module. In a third example, the HMI can trigger the controller to automatically level the module.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPU, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A robotic foodstuff assembly system, comprising:
a frame;
a foodstuff assembly robot statically mounted to the frame, the foodstuff assembly robot comprising an arm and a utensil mounted to the arm; and
a pair of stabilizers supporting the frame, each stabilizer of the pair of stabilizers comprising:
  a sleeve bearing mounted to the frame, the sleeve bearing defining a central axis;
  a leg arranged within the sleeve bearing, wherein the leg comprises a manual adjustment mechanism configured to retract the leg along the central axis;
  a foot mechanically coupled to the leg and contacting a floor surface;
  a wheel mounted to the frame and positioned above the floor surface; and
  an electric actuator mechanically coupling the leg to the frame via a set of joints, wherein the electric actuator is configured to actuate the leg along the central axis.

2. The robotic foodstuff assembly system of claim 1, wherein the set of joints comprises a pair of hinges in series along a kinematic chain, the kinematic chain coupling the frame to the floor surface.

3. The robotic foodstuff assembly system of claim 2, wherein the electric actuator is arranged between the pair of hinges.

4. The robotic foodstuff assembly system of claim 1, wherein the manual adjustment mechanism is a first screw mechanically coupled to the leg and coaxial with the central axis, and wherein the electric actuator comprises a second screw coaxial with the central axis, wherein the second screw is a lead screw.

5. The robotic foodstuff assembly system of claim 4, wherein all threads of the first screw and second screw are fluidly separated from an ambient environment.

6. The robotic foodstuff assembly system of claim 1, wherein the floor surface has a slope of over 2°.

7. The robotic foodstuff assembly system of claim 1, wherein the electric actuator is articulatable between a first position and a second position to transform the respective stabilizer between a first mode and a second mode, respectively, wherein, in the first mode, the wheel is offset from the floor surface, and wherein, in the second mode, the wheel contacts the floor surface.

8. The robotic foodstuff assembly system of claim 7, wherein the robotic foodstuff assembly system defines a support polygon at the floor surface, wherein the support polygon is larger with the pair of stabilizers in the first mode than in the second mode.

9. The robotic foodstuff assembly system of claim 7, wherein the manual adjustment mechanism of the respective stabilizer is configured to retract the foot along the respective central axis to manually transform the respective stabilizer between the first mode and the second mode.

10. The robotic foodstuff assembly system of claim 1, wherein a manual adjustable length of the manual adjustment mechanism is at least a maximum stroke length of the electric actuator.

11. The robotic foodstuff assembly system of claim 1, further comprising:

a dead-man's switch mechanically coupled to the frame;

a control switch mechanically coupled to the frame and spatially separated from the dead-man's switch by a distance exceeding 8 inches; and a processing system communicatively coupled to the dead-man's switch and the control switch, wherein the processing system is configured to control the foodstuff assembly robot to perform an action only when both the dead-man's switch and the control switch are simultaneously activated.

12. The robotic foodstuff assembly system of claim 1, wherein the robotic foodstuff assembly system is arranged along a conveyor line, and wherein the arm of the robotic foodstuff assembly system and the pair of stabilizers are both mounted to the frame at a side of the robotic foodstuff assembly system distal from the conveyor line.

13. A system, comprising:

a frame comprising a sleeve bearing, the sleeve bearing defining a central axis;

a wheel mounted to the frame; and an electric actuator mechanically coupled to the frame and actuatable along the central axis;

a foot; and a linkage mechanically coupling the electric actuator to the foot, the linkage comprising:

a leg arranged within the sleeve bearing and actuatable relative to the sleeve bearing along the central axis, wherein the leg defines, along a single kinematic chain:

a first joint superior to the sleeve bearing, wherein the electric actuator is coupled to the leg at the first joint;

a threaded interface arranged axially along the central axis, wherein the threaded interface defines a manual actuation stroke parallel with the central axis; and a second joint inferior to the sleeve bearing, wherein the foot is mechanically coupled to the leg at the second joint.

14. The system of claim 13, wherein the first joint is a hinge.

15. The system of claim 14, wherein the electric actuator is coupled to the frame via a third joint, wherein the third joint is a hinge.

16. The system of claim 13, wherein the electric actuator defines a first stroke length along the central axis, and wherein the threaded interface provides a second stroke length along the central axis, wherein the second stroke length is at least the first stroke length.

17. The system of claim 13, wherein a range of travel along the threaded interface is at least a maximum stroke length of the electric actuator.

18. The system of claim 13, wherein the electric actuator comprises an electric motor and lead screw, wherein all threads of both the lead screw and the threaded interface are enclosed and fluidly isolated from an ambient environment.

19. The system of claim 13, wherein an inferior region of the foot comprises a deformable material.

20. The system of claim 13, wherein the sleeve bearing constrains movement of the leg during manual adjustment via the threaded interface.

\* \* \* \* \*